(No Model.)
E. A. SANDERS.
SCISSORS OR SHEARS.
No. 541,013. Patented June 11, 1895.
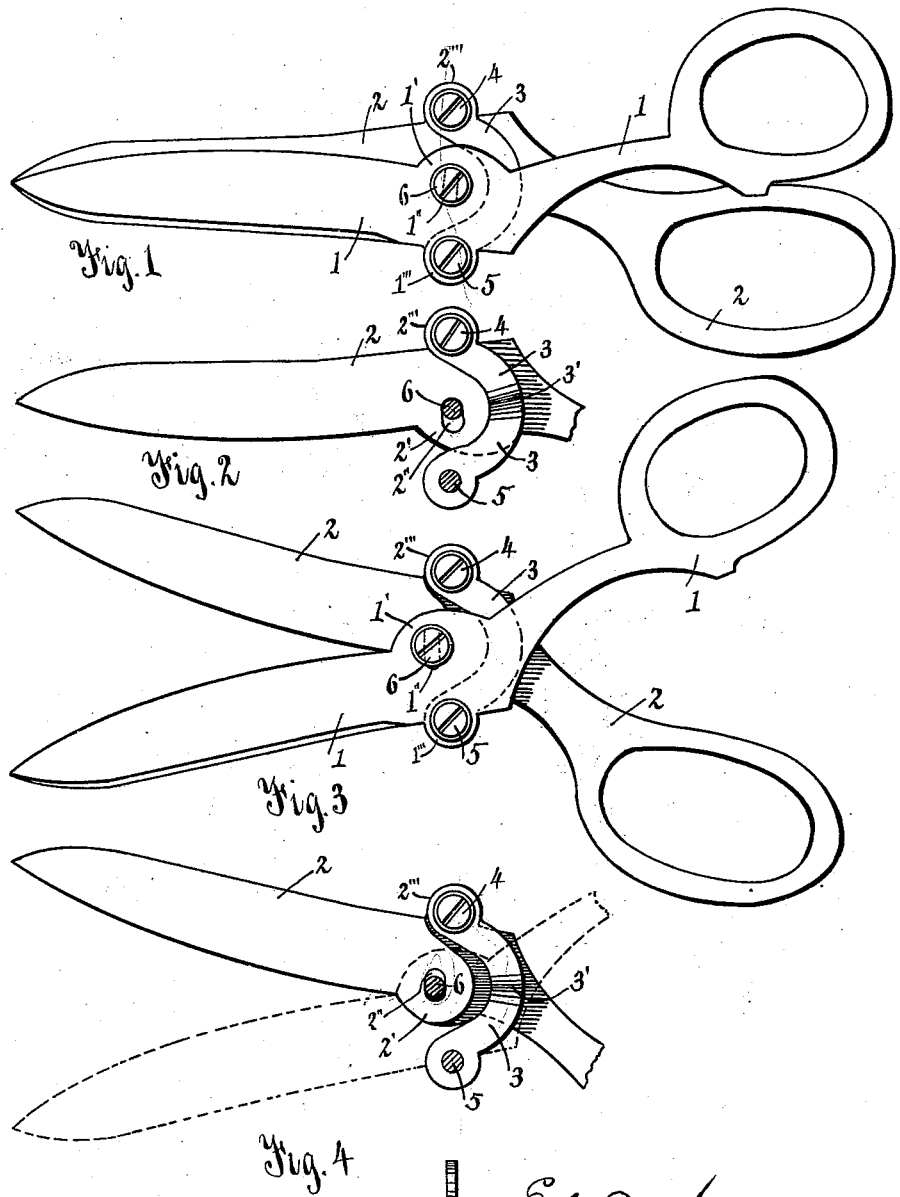
WITNESSES:
Edward A. Sanders, INVENTOR
BY
ATTORNEY

UNITED STATES PATENT OFFICE.

EDWARD A. SANDERS, OF SAGINAW, MICHIGAN.

SCISSORS OR SHEARS.

SPECIFICATION forming part of Letters Patent No. 541,013, dated June 11, 1895.

Application filed November 19, 1894. Serial No. 529,281. (No model.)

*To all whom it may concern:*

Be it known that I, EDWARD A. SANDERS, a citizen of the United States, residing at Saginaw, in the county of Saginaw and State of Michigan, have invented certain new and useful Improvements in Shears; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to shears, its object being to so arrange and connect the blades of the shears that greater leverage may be had.

In my Letters Patent of the United States, No. 481,200, dated August 23, 1893, I have endeavored to accomplish the same purpose.

The device herein shown and described possesses greater novelty and affords greater leverage than the invention above named.

Figure 1 is a side view of the scissors closed. Fig. 2 is a view of one of the blades with the other blade removed, showing the blade in the position when closed. Fig. 3 is a side view of the shears opened. Fig. 4 is the same view of one of the blades opened, with the other blade in dotted lines. Fig. 5 is a rear view of the link 3.

In the drawings, 1 and 2 are the shear blades, which for convenience of reference I will designate as 1 being the upper blade and 2 the lower. These blades have each upon the back edge thereof, and at a point opposite the pivot of the ordinary shears, a lug, 1''' and 2'''. These lugs are provided with eyelets for receiving the pivots 4 and 5.

6 is the usual binding bolt connected through the blades of the shears and is in the line of the cut. This bolt is loose in the transverse slots 1'' and 2'' formed in the lugs 1' and 2' on the cutting side of the blades.

3 is a link having eyes on each end and adapted to receive the pivots 4 and 5 and thus be connected to the lugs 1''' and 2''' and to the back of the blades. This link is bowed around the lugs 1' and 2' receiving the pivot 6. The lower blade, 2, is recessed on its inner side commencing just in front of the lug 2''' and extending on a curve across the blade around the lower edge of the lug 2'. The blade 1 has a corresponding recess. These recesses are for the purpose of permitting the link 3 to do its work.

It will be observed in Fig. 5 that the link 3 is not straight, but has an offset at its middle, 3', for the purpose of making it fit the recesses in the blades. These recesses are of sufficient depth to cause the link when placed therein to be flush with the inner surface of the blades. The link 3 is pivoted to the blade 1 by the pivot 5 through the link and the lug 1''' and pivoted to the blade 2 by the pivot 4 through the link and the lug 2'''. The binding bolt 6 is simply for the purpose of holding the cutting edges of the blades together, and the transverse eye 2' allows the bolt to move laterally so as not to bind the shears when operated.

It will be seen that the fulcrum for the leverage of the handle of the blade 1 is the pivot 4, while the fulcrum for the leverage of the handle of the blade 2 is the pivot 5, the movement and leverage being similar to that of a toggle joint.

When the shears are closed, as in Fig. 1, the three pivots, 4, 5, and 6 are in line. When open, as in Fig. 4, the binding bolt 6 is in front of the other pivots.

It is obvious that various changes may be made in the construction such as ordinary mechanical skill may suggest without departing from the principle of my invention.

Having thus described my invention, what I claim as new, and desire to secure by Letters Patent, is—

1. A new article of manufacture, a pair of shears consisting of two blades of the usual form having upon the backs thereof lugs, the lugs being provided with eyes, the blades having also transverse slots below the edge of the cutting surface of each blade for a binding bolt, a binding bolt loose in the slots and in the line of the cut of the shears, a bow or link fitting in recesses on the inner surface of the blades, the link having eyes at each end thereof, pivots through the eyes and through the lugs on the back of the blades pivoting the blades to the link, substantially as described.

2. In a pair of shears, the combination with the two blades of the shears each having a lug upon the back thereof, and an eye in the lug, of a link or bow adapted to be pivoted between the shears by pivots passing through the eyes in the lugs, substantially as described.

3. In a pair of shears, the combination with a pair of blades having a link between them recessed in each blade, and to the ends of which a blade is pivoted, of the link between the blades, and a binding bolt loose in transverse slots in the blades, substantially as described.

4. In a pair of shears, the combination with a link between the blades of the shears adapted to be pivoted to the blades, of blades recessed to receive a link, and a binding bolt, substantially as described.

5. In a pair of shears, the combination with the blades of the shears of a link between the blades pivotally connected to the shears and a binding bolt passing through the shears below their cutting edge and in line with the pivotal connection of the link, substantially as described.

6. In a pair of shears, the blades for the shears formed in the usual manner and having in the rear of the cutting edge lugs on each blade, both in the front and back thereof, said lugs being opposite and having eyes therein, the eyes in the the front lugs being oblong and transverse of the blade and larger than the binding bolt, and recesses in each blade extending from just in front of the outer lug around and to the rear of the inner lug, and a link fitting in these recesses and pivoted through the eye of each of the outer lugs, substantially as described.

7. The combination in a pair of shears of blades formed in the usual manner and having in the rear of the cutting edge of each blade eyes through the blade, and having below the cutting edge of each blade transverse slots, a binding bolt through the transverse slots and in line with the shear cut, each blade having recesses extending from just in front of the eyes across the blades, with a link adapted to fit between the blades in the recesses in the blades and to extend from the eye in the rear of each cutting edge to the opposite eye and to be pivoted through these eyes to the blades, substantially as described.

8. A pair of shears wherein the fulcrum of each blade is upon the opposite blade and connected to its blade by a lever between the blades extending from the fulcrum of one blade to the fulcrum of the opposite blade, and means for holding the blades together and preventing a draw cut consisting of transverse slots in each blade below their cutting edges, and a binding bolt loose in these slots, substantially as described.

9. In a pair of shears, a central pivot working in transverse slots in the shears below their cutting edges and preventing the shears from sliding one upon the other, a fulcrum for each blade in the rear of the cutting edge of the opposite blade, a lever between the blades connecting each blade to its fulcrum and at the same time connecting the fulcrums between the blades, substantially as described.

In testimony whereof I affix my signature in presence of two witnesses.

EDWARD A. SANDERS.

Witnesses:
FANNIE ROBBINS,
A. H. SWARTHOUT.